United States Patent
Matsui 4,062,630
Dec. 13, 1977

[54] TELEPHOTO LENS SYSTEM

[75] Inventor: Sei Matsui, Kawasaki, Japan

[73] Assignee: Nippon Kogaku K.K., Tokyo, Japan

[21] Appl. No.: 665,867

[22] Filed: Mar. 11, 1976

[30] Foreign Application Priority Data

Mar. 17, 1975 Japan .................................. 50-32020
Mar. 17, 1975 Japan .................................. 50-32021
Oct. 31, 1975 Japan .................................. 50-130487

[51] Int. Cl.$^2$ .............................................. G02B 13/02
[52] U.S. Cl. .................................................. 350/223
[58] Field of Search ............................... 350/220, 223

[56] References Cited

U.S. PATENT DOCUMENTS 2,481,688  9/1949  Schade et al. ......................... 350/223

FOREIGN PATENT DOCUMENTS 47-1907  1/1972  Japan .................................. 350/223

*Primary Examiner*—Conrad J. Clark
*Attorney, Agent, or Firm*—Shapiro and Shapiro

[57] ABSTRACT

A telephoto lens system having a relatively large aperture is composed of six lenses collected into four lens members, successively arranged, from the object side of the system to the image side, as follows: a first lens member including a positive lens whose convex surface faces the object side; a second lens member including a negative meniscus lens whose convex surface faces the object side and, a positive meniscus lens cemented to the negative meniscus lens; a third lens member including a positive lens whose convex surface faces the image side, and a biconcave lens cemented to the positive lens; and a fourth lens member consisting of a positive lens.

The aberrations of the telephoto lens system of the invention are reduced even though the aperture is relatively larger than the apertures of prior art lens.

8 Claims, 16 Drawing Figures

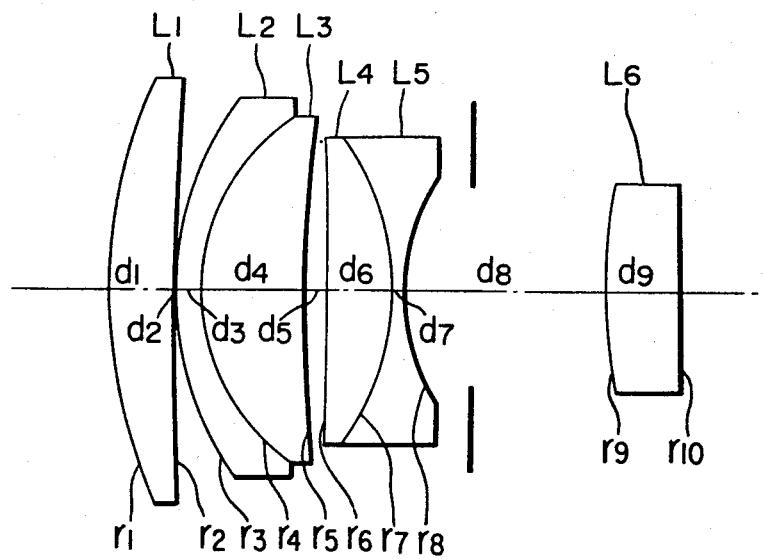

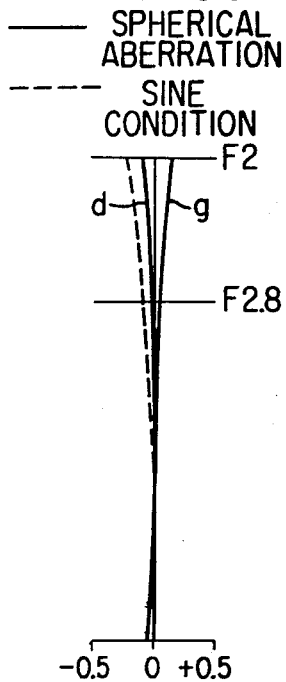
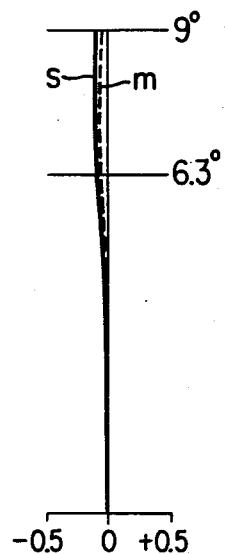
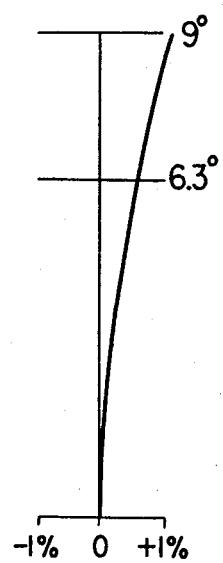
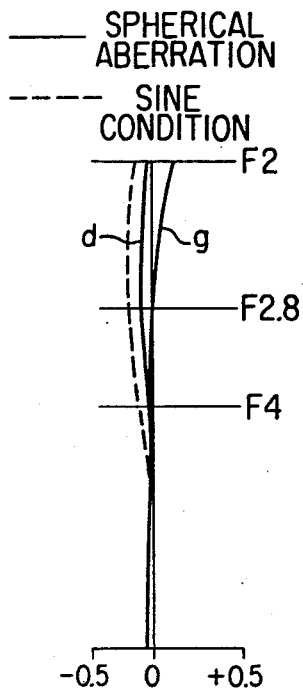
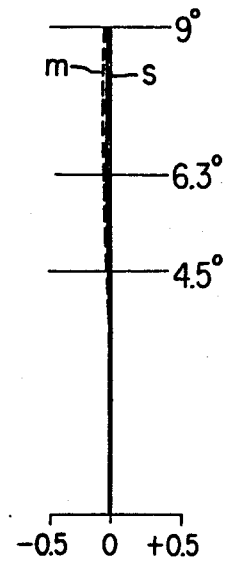
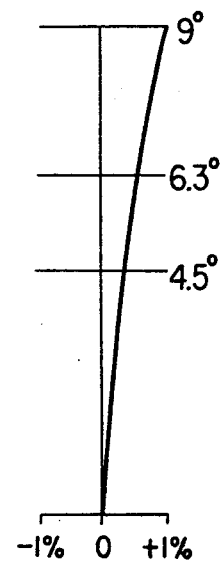

SPHERICAL ABERRATION
---- SINE CONDITION

ASTIGMATISM

DISTORTION

SPHERICAL ABERRATION
---- SINE CONDITION

ASTIGMATISM

DISTORTION

TELEPHOTO LENS SYSTEM

BACKGROUND OF THE INVENTION

1. Field of the Invention

The present invention relates to telephoto lens systems, and more particularly to a telephoto lens system having improved aberration correction.

2. Description of the Prior Art

Conventional telephoto lens have not been realized with a relative aperture exceeding 1 : 2.8, because telephoto lens that are this bright are difficult to correct for spherical aberration in the vicinity of g-line (453.8m$\mu$) light.

SUMMARY OF THE INVENTION

The present invention provides a relatively bright telephoto lens system utilizing two cemented lenses in a Tele-Sonnar type of lens system, and arranged so that various aberrations are effectively corrected. The system includes four members successively arranged, from the object side of the system to the image side, as follows: a first lens member including a positive lens whose convex surface faces the object side; a second lens member having two lens with a composite positive refractive power and including a negative meniscus lens whose convex surface faces the object side, and a positive meniscus lens cemented to the negative meniscus lens; a third lens member having two lenses with a composite negative refractive power including a positive lens whose convex surface faces the image side, and a biconcave lens cemented to the positive lens; and a fourth lens member consisting of a positive lens.

BRIEF DESCRIPTION OF THE DRAWINGS

Embodiments of the invention are illustrated in the accompanying drawing wherein:

FIG. 1 is a sectional view of a lens system according to the present invention;

FIGS. 2a, 2b and 2c illustrate, respectively, spherical aberration, astigmatism and distortion for the embodiment of Example I;

FIGS. 3a, 3b, and 3c illustrate, respectively, spherical aberration, astigmatism and distortion for the embodiment of Example II;

FIGS. 4a, 4b, and 4c illustrate, respectively, spherical aberration, astigmatism and distortion for the embodiment of Example III;

DESCRIPTION OF THE PREFERRED EMBODIMENTS

Figure 5A:
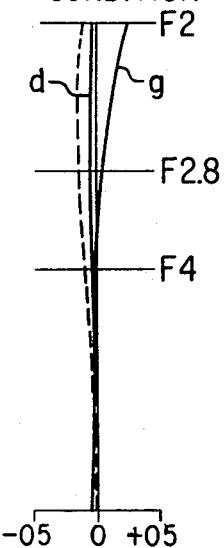
FIGS. 5a, 5b and 5c illustrate, respectively, spherical aberration, astigmatism and distortion for the embodiment of Example IV.

FIG. 1 shows a Tele-Sonnar type lens system constructed in accordance with the present invention. The system includes four members successively arranged, from the object side of the system to the image side as follows: a first lens member including a positive lens L1 whose convex surface faces the subject side; a second lens member having positive refractive power including a negative meniscus lens L2 and a positive meniscus lens L3; a third lens member having negative refractive power including a positive lens L4 and a biconcave lens L5; and a fourth lens member consisting of a positive lens L6 whose convex surface faces the subject side. The convex surface of lens L2 faces the subject side of the system; and the convex surface of lens L3 is cemented to the concave side of lens L2. The convex surface of lens L4 faces the image side of the system and the biconcave lens L5 is cemented to the convex surface of lens L4.

The significance of the second and the third lens members in achieving the desired aberration correction may be explained with reference to the problems of a relatively bright conventional telephoto lens. It is possible to efficiently correct various aberrations with respect to light of a given wavelength. When the aperture is relatively large, excessive correction of spherical aberration is effected for relatively short wavelength in the vicinity of the g-line (435.8m$\mu$), resulting in a large increase in coma. The resultant telephoto lens is not practical by reason of these deficiencies.

In the present invention, the third lens member consists of positive lens L4, whose convex surface faces the image side, whose radius of curvature $r_7 <$ O, and is cemented to the biconcave lens L5. As a consequence, excessive correction of spherical aberration is decreased for light in the vicinity of the g-line. If the cemented surface were convex with respect to the subject side, then the efficiency as above mentioned would be reduced. Designating the refractive indexes and the Abbe numbers of the positive lens L4 and the negative lens L5 in the third lens member as $\mu 4$, $\mu 5$ and $\nu 4$, $\nu 5$, respectively, the condition of $\eta 4 > \eta 5$, $5 > (\nu 5 - \nu 4) > 0.5$, $\nu 4 < 35$ and $\nu 5 < 35$ will result in the efficient reduction of excessive correction.

In the case where the cemented surface is convex with respect to the subject side, resulting in excessive correction of spherical aberration for light in the vicinity of the g-line, the chromatic aberration of the entire lens system cannot be balanced. The second lens member of the present invention prevents an imbalance because the convex surfaces of lenses 2 and 3 face the subject side. This construction reduces chromatic aberration. If the condition of $(\nu 3 - \nu 2) > 14$ is met, wherein $\nu 2$ and $\nu 3$ are the Abbe numbers of the negative L2 and positive lens L3 respectively, the chromatic aberration can be balanced more effectively.

Embodiments of the present invention are listed below:

EXAMPLE I

| Radii | | Thicknesses & Distance | Refractive Indexes | Abbe numbers |
|---|---|---|---|---|
| $r_1$ = | 58.0 | | | |
| | | $d_1 = 7.778$ | $\eta_1 = 1.713$ | $\nu d_1 = 53.9$ |
| $r_2$ = | 305.630 | | | |
| | | $d_2 = 0.370$ | | |
| $r_3$ = | 38.148 | | | |
| | | $d_3 = 2.741$ | $\eta_2 = 1.62374$ | $\nu d_2 = 47.0$ |
| $r_4$ = | 24.689 | | | |
| | | $d_4 = 13.259$ | $\eta_3 = 1.58913$ | $\nu d_3 = 61.2$ |
| $r_5$ = | 216.711 | | | |
| | | $d_5 = 2.593$ | | |
| $r_6$ = | $\infty$ | | | |
| | | $d_6 = 8.815$ | $\eta_4 = 1.74077$ | $\nu d_4 = 27.7$ |
| $r_7$ = | $-30.963$ | | | |
| | | $d_7 = 1.259$ | $\eta_5 = 1.72825$ | $\nu d_5 = 28.3$ |
| $r_8$ = | 22.734 | | | |
| | | $d_8 = 24.074$ | | |
| $r_9$ = | 62.963 | | | |
| | | $d_9 = 9.630$ | $\eta_6 = 1.68893$ | $\nu d_6 = 31.1$ |
| $r_{10}$ = | 1247.453 | | | |

Focal length f=100 mm, F number F=2.0
View angle 2W=18°

Various aberrations in Example I are plotted in FIGS. 2a, 2b, and 2c where reference characters d, g, S and m represent, respectively, the d-line, g-line, sagittal rays and meridional rays.

EXAMPLE II

| | | | | | | |
|---|---|---|---|---|---|---|
| $r_1$ | = | 61.667 | | | | |
| | | | $d_1 = 8.296$ | $\eta_1 = 1.6935$ | $vd_1 = 53.5$ | |
| $r_2$ | = | 306.773 | | | | |
| | | | $d_2 = 0.370$ | | | |
| $r_3$ | = | 37.370 | | | | |
| | | | $d_3 = 2.741$ | $\eta_2 = 1.62004$ | $vd_2 = 36.3$ | |
| $r_4$ | = | 22.370 | | | | |
| | | | $d_4 = 13.259$ | $\eta_3 = 1.58913$ | $vd_3 = 61.2$ | |
| $r_5$ | = | 189.613 | | | | |
| | | | $d_5 = 2.593$ | | | |
| $r_6$ | = | −2222.222 | | | | |
| | | | $d_6 = 8.889$ | $\Theta_4 = 1.68893$ | $vd_4 = 31.1$ | |
| $r_7$ | = | −38.519 | | | | |
| | | | $d_7 = 1.185$ | $\eta_5 = 1.64769$ | $vd_5 = 33.9$ | |
| $r_8$ | = | 22.210 | | | | |
| | | | $d_8 = 23.330$ | | | |
| $r_9$ | = | 59.259 | | | | |
| | | | $d_9 = 8.890$ | $\eta_6 = 1.64769$ | $vd_6 = 33.9$ | |
| $r_{10}$ | = | 395.706 | | | | | f=100 mm  F=2.0  2W=18°

Various aberrations in Example II are plotted in FIGS. 3a, 3b and 3c.

EXAMPLE III

| | | | | | | |
|---|---|---|---|---|---|---|
| $r_1$ | = | 62.222 | | | | |
| | | | $d_1 = 8.30$ | $\eta_1 = 1.6935$ | $vd_1 = 53.5$ | |
| $r_2$ | = | 306.773 | | | | |
| | | | $d_2 = 0.37$ | | | |
| $r_3$ | = | 35.704 | | | | |
| | | | $d_3 = 2.74$ | $\eta_2 = 1.6398$ | $vd_2 = 34.6$ | |
| $r_4$ | = | 21.630 | | | | |
| | | | $d_4 = 13.26$ | $\eta_3 = 1.58913$ | $vd_3 = 61.2$ | |
| $r_5$ | = | 159.919 | | | | |
| | | | $d_5 = 2.59$ | | | |
| $r_6$ | = | 2222.222 | | | | |
| | | | $d_6 = 8.89$ | $\eta_4 = 1.69895$ | $vd_4 = 30.0$ | |
| $r_7$ | = | −44.444 | | | | |
| | | | $d_7 = 1.19$ | $\eta_5 = 1.6398$ | $vd_5 = 34.6$ | |
| $r_8$ | = | 21.591 | | | | |
| | | | $d_8 = 24.44$ | | | |
| $r_9$ | = | 53.333 | | | | |
| | | | $d_9 = 7.41$ | $\eta_6 = 1.64769$ | $vd_6 = 33.9$ | |
| $r_{10}$ | = | 185.383 | | | | | f=100 mm  F=2.0  2W=18°

Various aberrations in Example III are plotted in FIGS. 4a, 4b and 4c.

EXAMPLE IV

| | | | | | | |
|---|---|---|---|---|---|---|
| $r_1$ | = | 61.67 | | | | |
| | | | $d_1 = 8.30$ | $\eta_1 = 1.6935$ | $vd_1 = 53.5$ | |
| $r_2$ | = | 306.773 | | | | |
| | | | $d_2 = 0.37$ | | | |
| $r_3$ | = | 37.040 | | | | |
| | | | $d_3 = 2.74$ | $\eta_2 = 1.62004$ | $vd_2 = 36.3$ | |
| $r_4$ | = | 22.118 | | | | |
| | | | $d_4 = 13.26$ | $\eta_3 = 1.58913$ | $vd_3 = 61.2$ | |
| $r_5$ | = | 177.778 | | | | |
| | | | $d_5 = 2.59$ | | | |
| $r_6$ | = | ∞ | | | | |
| | | | $d_6 = 8.89$ | $\eta_4 = 1.68893$ | $vd_4 = 31.1$ | |
| $r_7$ | = | −40.459 | | | | |
| | | | $d_7 = 1.19$ | $\eta_5 = 1.64769$ | $vd_5 = 33.9$ | |
| $r_8$ | = | 21.994 | | | | |
| | | | $d_8 = 23.04$ | | | |
| $r_9$ | = | 59.259 | | | | |
| | | | $d_9 = 8.89$ | $\eta_6 = 1.64769$ | $vd_6 = 33.9$ | |
| $r_{10}$ | = | 356.104 | | | | | f=100 mm,  F=2.0,  2W=18°

Figure 5B:
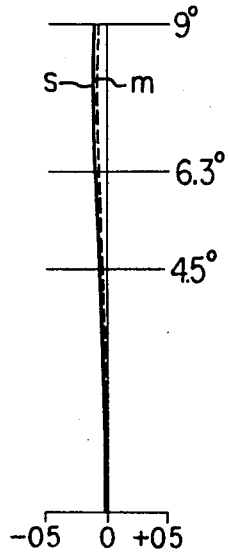
Figure 5C:
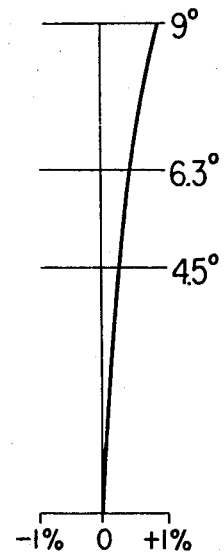

Various aberrations in Example IV are plotted in FIGS. 5a, 5b and 5c.

EXAMPLE V

| | | | | | | |
|---|---|---|---|---|---|---|
| $r_1$ | = | 58.015 | | | | |
| | | | $d_1 = 8.22$ | $\eta_1 = 1.717$ | $vd_1 = 48.1$ | |
| $r_2$ | = | 311.111 | | | | |
| | | | $d_2 = 0.37$ | | | |
| $r_3$ | = | 38.148 | | | | |
| | | | $d_3 = 2.74$ | $\eta_2 = 1.62606$ | $vd_2 = 39.1$ | |
| $r_4$ | = | 22.593 | | | | |
| | | | $d_4 = 13.26$ | $\eta_3 = 1.58913$ | $vd_3 = 61.2$ | |
| $r_5$ | = | 200.000 | | | | |
| | | | $d_5 = 2.59$ | | | |
| $r_6$ | = | ∞ | | | | |
| | | | $d_6 = 8.89$ | $\eta_4 = 1.74$ | $vd_4 = 28.2$ | |
| $r_7$ | = | −34.815 | | | | |
| | | | $d_7 = 1.19$ | $\eta_5 = 1.71736$ | $vd_5 = 29.5$ | |
| $r_8$ | = | 22.797 | | | | |
| | | | $d_8 = 25.11$ | | | |
| $r_9$ | = | 63.661 | | | | |
| | | | $d_9 = 8.89$ | $\eta_6 = 1.71736$ | $vd_6 = 29.5$ | |
| $r_{10}$ | = | 624.694 | | | | | f=100 mm,  F=2.0,  2W=18°

Figure 6A:
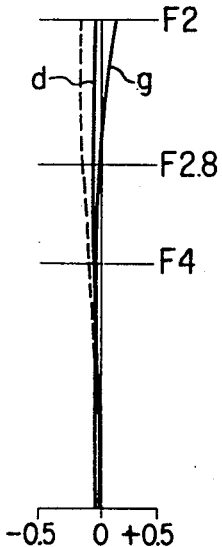
FIGS. 6a, 6b, and 6c illustrate, respectively, spherical aberration, astigmatism and distortion for the embodiment of Example V.
Figure 6B:
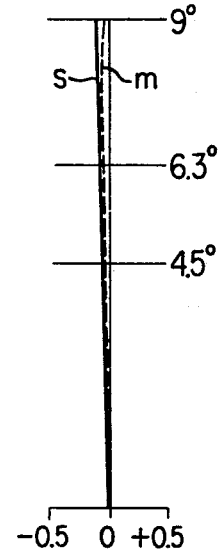
Figure 6C:
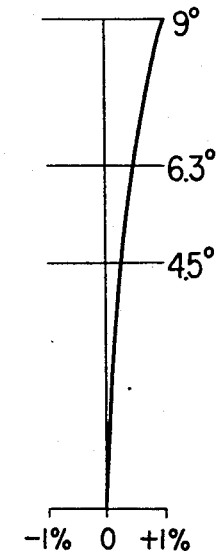

Various aberrations in Example V are plotted in FIGS. 6a, 6b and 6c.

Although the optical systems of the present invention are much brighter than systems in the prior art, aberrations are corrected as well as in the conventional systems.

The telephoto ratio, or the ratio of the total length T.L. of the lens system from the foremost lens surface to the focal plane divided by the focal length f is listed for each of the five Examples of the telephoto lens system according to the present invention. These values are derived from the calculation of the aforementioned data. The less these values are, the less the size of the telephoto lens.

| Example | $\Sigma D$ | B.f. | T.L. | Telephoto ratio (T.L./f) |
|---|---|---|---|---|
| I | 70.519 | 29.97 | 100.489 | 1.005 |
| II | 69.553 | 31.44 | 100.993 | 1.010 |
| III | 69.19 | 30.18 | 99.37 | 0.994 |
| IV | 69.27 | 31.19 | 100.46 | 1.005 |
| V | 71.26 | 29.22 | 100.48 | 1.005 | where B.f. is back focal distance, $\Sigma D = d_1 + d_2 + \ldots + d_9$ and T.L. = $\Sigma D$ + B.f.

It is believed that the advantages and improved results furnished by the telephoto lens system of the present invention will be apparent from the foregoing description of several preferred embodiments of the invention. Various changes and modifications may be made without departing from the spirit and scope of the invention as sought to be defined in the following claims.

I claim:

1. A telephoto lens system having an aperture ratio of approximately 1:2 and a telephoto ratio of approximately 1.0, the system comprising four members successively arranged, from the object side of the system to the image side, as follows:

a. a first lens member including a positive meniscus lens whose convex surface faces the object side;

b. a second lens member having positive refractive power and including a negative meniscus lens whose convex surface faces the object side, and a positive meniscus lens cemented to the negative meniscus lens;

c. a third lens member having negative refractive power and including a positive lens whose more curved surface faces the image side, and a biconcave lens cemented to the positive lens; and d. a fourth lens member including a positive lens.

2. A telephoto lens system according to claim 1, wherein the components of the lenses satisfy the relationships:

$$\eta 4 > \eta 5,$$

$$5 > (\nu 5 - \nu 4) > 0.5,$$

$$35 > \nu 4,$$

$$35 > \nu 5,$$

where $\eta 4$, $\eta 5$ and $\nu 4$, $\nu 5$ are the refractive indexes and Abbe numbers, respectively, of the positive and biconcave lens in the third lens member.

3. A telephoto lens system according to claim 1 wherein the components of the lens satisfy the relationship:

$$(\nu 3 - \nu 2) > 14,$$

where $\nu 2$, $\nu 3$ are the Abbe numbers of the negative and positive lenses respectively of the second lens member.

4. A telephoto lens system according to Claim 1 having the following data:

| Radii | | Thicknesses & Distance | Refractive Indexes | Abbe numbers |
|---|---|---|---|---|
| $r_1$ | = | 58.0 | | |
| | | $d_1 = 7.778$ | $\eta_1 = 1.713$ | $\nu d = 53.9$ |
| $r_2$ | = | 305.630 | | |
| | | $d_2 = 0.370$ | | |
| $r_3$ | = | 38.148 | | |
| | | $d_3 = 2.741$ | $\eta_2 = 1.62374$ | $\nu d_2 = 47.0$ |
| $r_4$ | = | 24.689 | | |
| | | $d_4 = 13.259$ | $\eta_3 = 1.58913$ | $\nu d_3 = 61.2$ |
| $r_5$ | = | 261.711 | | |
| | | $d_5 = 2.593$ | | |
| $r_6$ | = | ∞ | | |
| | | $d_6 = 8.815$ | $\eta_4 = 1.74077$ | $\nu d_4 = 27.7$ |
| $r_7$ | = | −30.963 | | |
| | | $d_7 = 1.259$ | $\eta_5 = 1.72825$ | $\nu d_5 = 28.3$ |
| $r_8$ | = | 22.734 | | |
| | | $d_8 = 24.074$ | | |
| $r_9$ | = | 62.963 | | |
| | | $d_9 = 9.630$ | $\eta_6 = 1.68893$ | $\nu d_6 = 31.1$ |
| $r_{10}$ | = | 1247.453 | | |

Focal length f=100 mm, F number F=2.0
View Angle 2W=18°.

5. A telephoto lens system according to claim 1 having the following data:

| Radii | | Thicknesses & Distance | Refractive Indexes | Abbe numbers |
|---|---|---|---|---|
| $r_1$ | = | 61.667 | | |
| | | $d_1 = 8.296$ | $\eta_1 = 1.6935$ | $\nu d_1 = 53.5$ |
| $r_2$ | = | 306.773 | | |
| | | $d_2 = 0.370$ | | |
| $r_3$ | = | 37.370 | | |
| | | $d_3 = 2.741$ | $\eta_2 = 1.62004$ | $\nu d_2 = 36.3$ |
| $r_4$ | = | 22.370 | | |
| | | $d_4 = 13.259$ | $\eta_3 = 1.58913$ | $\nu d_3 = 61.2$ |
| $r_5$ | = | 189.613 | | |
| | | $d_5 = 2.593$ | | |
| $r_6$ | = | −2222.222 | | |
| | | $d_6 = 8.889$ | $\eta_4 = 1.68893$ | $\nu d_4 = 31.1$ |
| $r_7$ | = | −38.519 | | |
| | | $d_7 = 1.185$ | $\eta_5 = 1.64769$ | $\nu d_5 = 33.9$ |
| $r_8$ | = | 22.210 | | |
| | | $d_8 = 23.330$ | | |
| $r_9$ | = | 59.259 | | |
| | | $d_9 = 8.890$ | $\eta_6 = 1.64769$ | $\nu d_6 = 33.9$ |
| $r_{10}$ | = | 395.706 | | |

Focal length f=100 mm, F number F=2.0
View Angle 2W=18°.

6. A telephoto lens system according to claim 1 having the following data:

| Radii | | Thicknesses & Distance | Refractive Indexes | Abbe numbers |
|---|---|---|---|---|
| $r_1$ | = | 62.222 | | |
| | | $d_1 = 8.30$ | $\eta_1 = 1.6935$ | $\nu d_1 = 53.5$ |
| $r_2$ | = | 306.773 | | |
| | | $d_2 = 0.37$ | | |
| $r_3$ | = | 35.704 | | |
| | | $d_3 = 2.74$ | $\eta_2 = 1.6398$ | $\nu d_2 = 34.6$ |
| $r_4$ | = | 21.630 | | |
| | | $d_4 = 13.26$ | $\eta_3 = 1.58913$ | $\nu d_3 = 61.2$ |
| $r_5$ | = | 159.919 | | |
| | | $d_5 = 2.59$ | | |
| $r_6$ | = | 2222.222 | | |
| | | $d_6 = 8.89$ | $\eta_4 = 1.69895$ | $\nu d_4 = 30.0$ |
| $r_7$ | = | −44.444 | | |
| | | $d_7 = 1.19$ | $\eta_5 = 1.6398$ | $\nu d_5 = 34.6$ |
| $r_8$ | = | 21.591 | | |
| | | $d_8 = 24.44$ | | |
| $r_9$ | = | 53.333 | | |
| | | $d_9 = 7.41$ | $\eta_6 = 1.64769$ | $\nu d_6 = 33.9$ |
| $r_{10}$ | = | 185.383 | | |

Focal length f=100 mm, F number F=2.0
View Angle 2W=18°.

7. A telephoto lens system according to claim 1 having the following data:

| Radii | | Thicknesses & Distance | Refractive Indexes | Abbe numbers |
|---|---|---|---|---|
| $r_1$ | = | 61.67 | | |
| | | $d_1 = 8.30$ | $\eta_1 = 1.6935$ | $\nu d_1 = 53.5$ |
| $r_2$ | = | 306.773 | | |
| | | $d_2 = 0.37$ | | |
| $r_3$ | = | 37.040 | | |
| | | $d_3 = 2.74$ | $\eta_2 = 1.62004$ | $\nu d_2 = 36.3$ |
| $r_4$ | = | 22.118 | | |
| | | $d_4 = 13.26$ | $\eta_3 = 1.58913$ | $\nu d_3 = 61.2$ |
| $r_5$ | = | 177.778 | | |
| | | $d_5 = 2.59$ | | |
| $r_6$ | = | ∞ | | |
| | | $d_6 = 8.89$ | $\eta_4 = 1.68893$ | $\nu d_4 = 31.1$ |
| $r_7$ | = | −40.459 | | |
| | | $d_7 = 1.19$ | $\eta_5 = 1.64769$ | $\nu d_5 = 33.9$ |
| $r_8$ | = | 21.994 | | |
| | | $d_8 = 23.04$ | | |
| $r_9$ | = | 59.259 | | |
| | | $d_9 = 8.89$ | $\eta_6 = 1.64769$ | $\nu d_6 = 33.9$ |
| $r_{10}$ | = | 356.104 | | |

Focal length f=100 mm, F number F=2.0
View Angle 2W=18°.

8. A telephoto lens system according to claim 1 having the following data:

| Radii | | Thicknesses & Distance | Refractive Indexes | Abbe numbers |
|---|---|---|---|---|
| $r_1$ | = | 58.015 | | |
| | | $d_1 = 8.22$ | $\eta_1 = 1.717$ | $\nu d_1 = 48.1$ |
| $r_2$ | = | 311.111 | | |
| | | $d_2 = 0.37$ | | |
| $r_3$ | = | 38.148 | | |
| | | $d_3 = 2.74$ | $\eta_2 = 1.62606$ | $\nu d_2 = 39.1$ |
| $r_4$ | = | 22.593 | | |
| | | $d_4 = 13.26$ | $\eta_3 = 1.58913$ | $\nu d_3 = 61.2$ |
| $r_5$ | = | 200.000 | | |
| | | $d_5 = 2.59$ | | |
| $r_6$ | = | ∞ | | |
| | | $d_6 = 8.89$ | $\eta_4 = 1.74$ | $\nu d_4 = 28.2$ |
| $r_7$ | = | −34.815 | | |
| | | $d_7 = 1.19$ | $\eta_5 = 1.71736$ | $\nu d_5 = 29.5$ |
| $r_8$ | = | 22.797 | | |
| | | $d_8 = 25.11$ | | |
| $r_9$ | = | 63.661 | | |
| | | $d_9 = 8.89$ | $\eta_6 = 1.71736$ | $\nu d_6 = 29.5$ |
| $r_{10}$ | = | 624.694 | | |

Focal length f=100 mm, F number F=2.0
View Angle 2W=18°.

* * * * *